(12) United States Patent
Lee

(10) Patent No.: US 8,572,657 B2
(45) Date of Patent: Oct. 29, 2013

(54) CONTROLLING PROGRAM GUIDE IN BROADCAST RECEIVING DEVICE

(75) Inventor: Suzin Lee, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 284 days.

(21) Appl. No.: 12/815,249

(22) Filed: Jun. 14, 2010

(65) Prior Publication Data

US 2011/0078733 A1 Mar. 31, 2011

(30) Foreign Application Priority Data

Sep. 30, 2009 (KR) ........................ 10-2009-0093457

(51) Int. Cl.
*G06F 3/00* (2006.01)
*G06F 13/00* (2006.01)
*G06F 3/048* (2013.01)
*H04N 5/445* (2011.01)

(52) U.S. Cl.
USPC .................. 725/47; 725/37; 725/39; 725/43; 725/52; 715/768; 715/790; 715/797; 715/798; 715/799; 715/800; 715/801

(58) Field of Classification Search
USPC ........................................................ 725/47
See application file for complete search history.

(56) References Cited

U.S. PATENT DOCUMENTS

| | | | |
|---|---|---|---|
| 5,933,141 A * | 8/1999 | Smith | 725/39 |
| 2003/0212995 A1* | 11/2003 | Kitamori | 725/41 |
| 2004/0237105 A1 | 11/2004 | Ha | |
| 2007/0101282 A1* | 5/2007 | Goossen et al. | 715/764 |
| 2010/0083313 A1* | 4/2010 | White et al. | 725/39 |

FOREIGN PATENT DOCUMENTS

| | | |
|---|---|---|
| KR | 10-2004-0099626 A | 12/2004 |
| KR | 10-2006-0134398 A | 12/2006 |
| KR | 10-2007-0074246 A | 7/2007 |

* cited by examiner

*Primary Examiner* — Chris Parry
*Assistant Examiner* — Omar S Parra
(74) *Attorney, Agent, or Firm* — Birch, Stewart, Kolasch & Birch, LLP

(57) ABSTRACT

A broadcast receiving device and a method for change one or more configurations of windows of a program guide displayed on a display unit of a broadcast receiving device according to a user input, are discussed.

15 Claims, 15 Drawing Sheets

CONTROLLING PROGRAM GUIDE IN BROADCAST RECEIVING DEVICE

CROSS-REFERENCE TO RELATED APPLICATIONS

The present application claims priority under 35 U.S.C. 119 and 35 U.S.C. 365 to Korean Patent Application No. 10-2009-0093457 filed on Sep. 30, 2009, which is hereby incorporated by reference in its entirety.

BACKGROUND

1. Field of the Invention

The present invention relates to a broadcast program guide of a broadcast receiving device. In more detail, the present invention relates to a broadcast receiving device and a method for allowing a user to change configurations of a program guide associated with broadcast signals.

2. Discussion of the Related Art

Using a related art digital TV or digital set top box, a broadcast guide about a digital broadcast is provided. The broadcast guide may include various information such as a broadcast order and detailed information for each broadcast program.

A related art program guide includes a plurality of windows, each of which has a fixed position, size and property. When a user executes a broadcast guide function, a program guide is displayed on a screen of the TV. However, the user only can view the program guide of a fixed format and cannot change the program guide according to the user's preference.

SUMMARY OF THE INVENTION

Embodiments of the invention provide a broadcast receiving device and a method for allowing a user to change sizes, arrangements, and other configurations of windows constituting a program guide.

Embodiments of the invention provide a method and device for changing at least one configuration of a program guide for broadcast signals, which address the limitations and disadvantages associated with the related art.

In one embodiment of the invention, an broadcast receiving device comprises: a broadcast receiver for receiving broadcast signals; a demodulator for demodulating the received broadcast signals to generate transport streams; a demultiplexer for demultiplexing the demodulated transport streams into video streams, audio streams and data streams; a program guide editing unit for generating a program guide including at least one window that displays information about the broadcast signals, and editing and outputting a configuration of the generated program guide; a controller for controlling the program guide editing unit to edit the program guide; and a user interface for delivering an input from a user to the controller.

In another embodiment, a method for editing a program guide of a display device comprises: displaying a program guide including at least one window; receiving a selection input for one of the plurality of the windows; receiving an edit command for editing the selected program guide from a user; and editing a configuration of the selected window according to the edit command.

According to another embodiment, the invention provides a broadcast receiving device comprising: a broadcast receiver configured to receive broadcast signals; a demodulator configured to demodulate the received broadcast signals to generate transport streams; a demultiplexer configured to demultiplex the demodulated transport streams into at least one of a video stream, an audio stream and a data stream; a user interface configured to provide a user input to a controller; a display unit configured to display a program guide including at least one window for displaying information associated with the broadcast signals; a program guide editing unit configured to edit the program guide displayed on the display unit according to the user input; and the controller configured to control the program guide editing unit to edit the program guide.

According to another embodiment, the invention provides an image processor comprising: a user interface configured to receive a user input; a program guide editing unit configured to editing a program guide including at least one window, according to the user input; and a controller configured to control the program guide editing unit and the user interface.

According to another embodiment, the invention provides a method for providing a program guide using an image processor including a program guide editing unit, the method comprising: receiving, by the image processor, a user input; and editing, by the program guide editing unit, a program guide including at least one window, according to the user input.

The details of one or more embodiments are set forth in the accompanying drawings and the description below. Other features will be apparent from the description and drawings, and from the claims.

DETAILED DESCRIPTION OF THE EMBODIMENTS

Hereinafter, the embodiments of the present invention will be described in more detail with reference to the drawings.

According to the embodiments, the invention allows editing or changing one or more configurations of a program guide displayed on a display unit of a broadcast receiving device. This can be done according to the user input, e.g., based on the user's preference. The configurations of the program guide, which can be changed according to the user input, can be at least one of the size, position and/or property of one or more windows of the program guide displayed on the display unit of the broadcast receiving unit. The property of the window(s) can be a size, color, font, letter size, wallpaper, and/or screen state value of the window(s). As a result, a user friendly and user-preferred program guide can be displayed to the user for the maximum use and satisfaction of the user.

Figure 1:
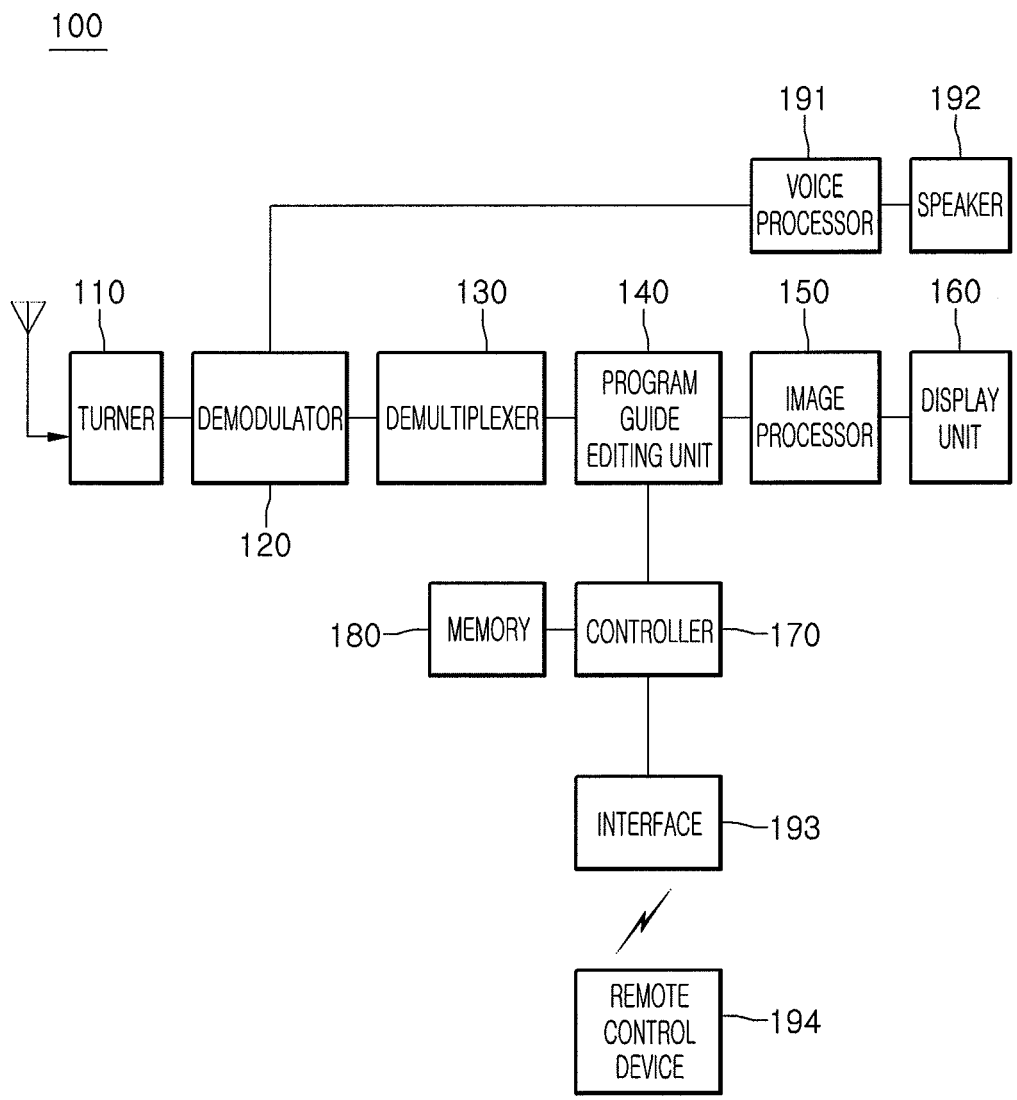
FIG. 1 is a block diagram of a broadcast receiving device according to an embodiment of the invention.

FIG. 1 is a block diagram of a broadcast receiving device according to an embodiment. The broadcast receiving device according to the present invention may be a TV (e.g., digital TV) or a set top box, or can be a computer, multimedia device, mobile terminal, etc. All the components of the broadcast receiving device are operatively coupled and configured.

A digital broadcast signal received through a tuner 110 of FIG. 1 is demodulated into a transport stream by a demodulator 120 of the broadcast receiving device 100. The transport stream is parsed into a data stream (including a video stream, an audio stream, and system information (PSIP/SI information)) by a demultiplexer 130. The parsed signals are decoded, respectively, by a video decoder, an audio decoder, and a PSIP/SI processor. The decoded video signal is converted into a video output signal by an image processor 150 after passing through a program guide editing unit 140 and then the video output signal is delivered to a display unit 160 for displaying. The decoded audio signal is converted into an audio/sound output signal by a voice/audio data processor 191 and then is delivered to a speaker or output unit 192.

An interface 193 delivers an input signal from a user to a controller 170 or delivers a signal from the controller 170 to the user. For example, the interface 193 receives a user input signal (such as power on/off, channel selection, screen setting signals, etc.) from a remote control device 194 and/or transmits a signal from the controller 170 to the remote control device 194 according to various communication methods such as a radio frequency (RF) communication method, an infrared (IR) communication method, a short-range communication method, a Bluetooth communication method, etc. As mentioned below, the remote control device 194 may be a motion-sensitive remote control device.

The controller 170 demultiplexes the streams/signals input thereto and performs signal processing on the demultiplexed signals such that the signals for image and voice output are generated and outputted. Besides that, the controller 170 may control the general operations of the broadcast receiving device 100, and controls the components of the broadcast receiving device 100.

A memory or storage unit 180 stores data and programs needed for the general operations of the broadcast receiving device 100. Besides that, the memory 180 may store video and audio data.

The broadcast receiving device 100 in FIG. 1 is illustrated with various components distinguished by their functions but one chip or several chips may perform all functions of the components of the broadcast receiving device 100.

Figure 2:
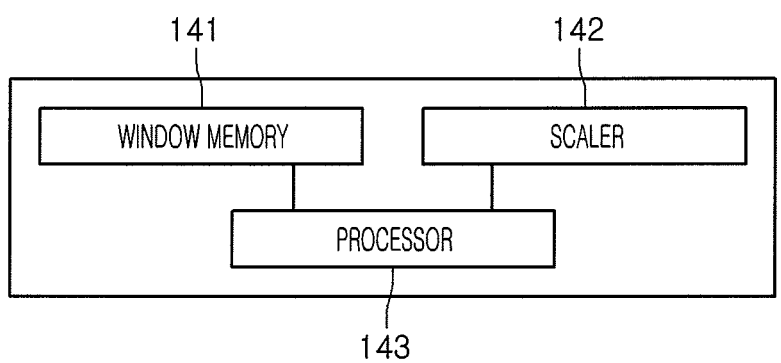
FIG. 2 is a diagram illustrating a configuration of the program guide editing unit according to an embodiment of the invention.

FIG. 2 is a block diagram illustrating a configuration of the program guide editing unit 140 according to an embodiment. As shown in FIG. 2, the program guide editing unit 140 edits a program guide for displaying information about broadcast signals received according to an input of a user.

As mentioned below (refer to FIG. 6), a program guide displayed on a screen or display unit of the broadcast receiving device 100 may include a plurality of regions or windows, for example, a video window for displaying an image corresponding to a video signal, a data window for displaying detailed information about a broadcast program that a user selects, and/or a schedule list window for displaying schedule information about a broadcast program.

As shown in FIG. 2, the program guide editing unit 140 may include a window memory 141, a scaler 142, and a processor 143. The window memory 141 stores information to be displayed in each window of the program guide. The scaler 142 performs a screen size adjustment of each window of the program guide according to the user input or information to be displayed. The processor 143 controls information stored in the window memory 141 to be displayed in a corresponding window of the program guide and controls the scaler 142 to adjust the screen size of each window of the program guide as needed.

The window memory 141 may be the same type as the memory 180 of the broadcast receiving device 100 of FIG. 1.

The processor 143 determines a target window (of which sizes, arrangements, or other configurations of the program guide are changed according to the user input) and a change method, and the scaler 142 edits the target window according to the determined change method. If an input of the user relates to changing the size of a specific window of the program guide, the scaler 142 adjusts the size of the corresponding window and then delivers it to the image processor 150. If the input of the user relates to changing an arrangement/position or property of a specific window of the program guide, the processor 143 performs the corresponding change to the program guide and delivers it to the image processor 150, which can then sent to the display unit 160 for displaying.

Figure 3:
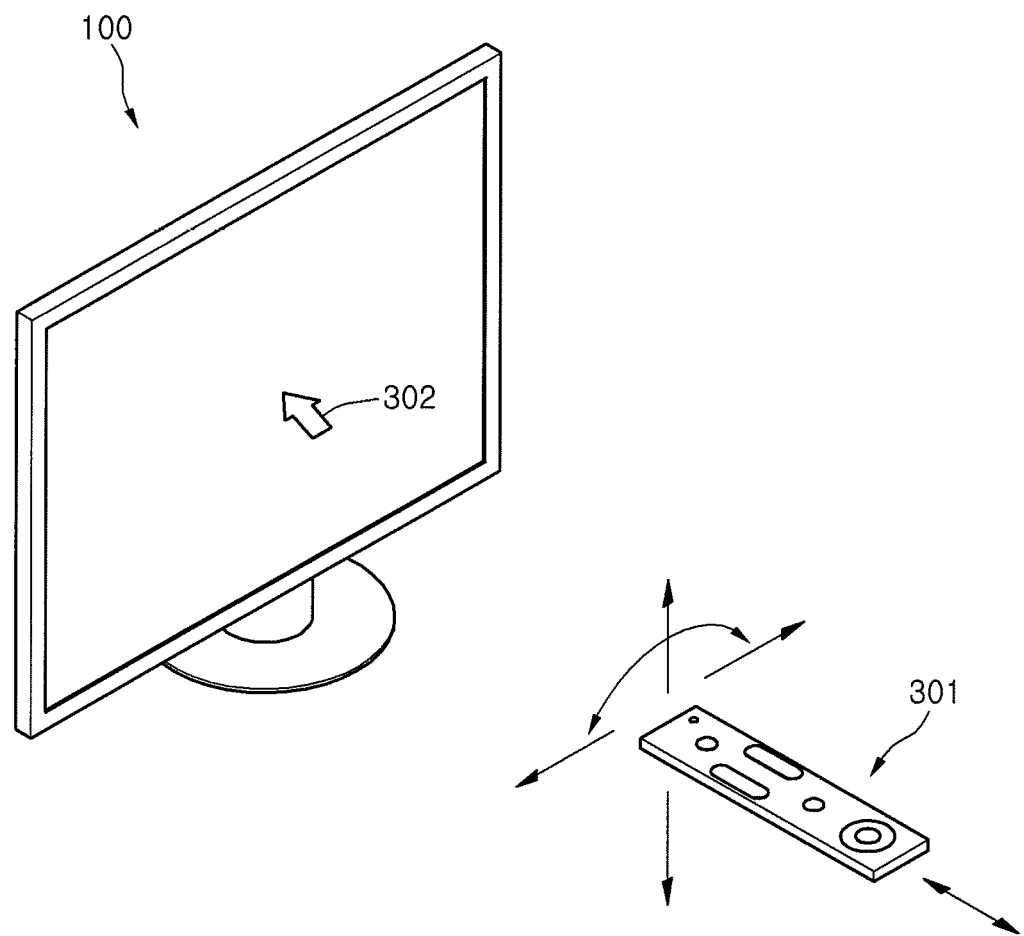
FIGS. 3 and 4 are views illustrating examples of using a motion-sensitive remote controller according to the present invention.
Figure 4:
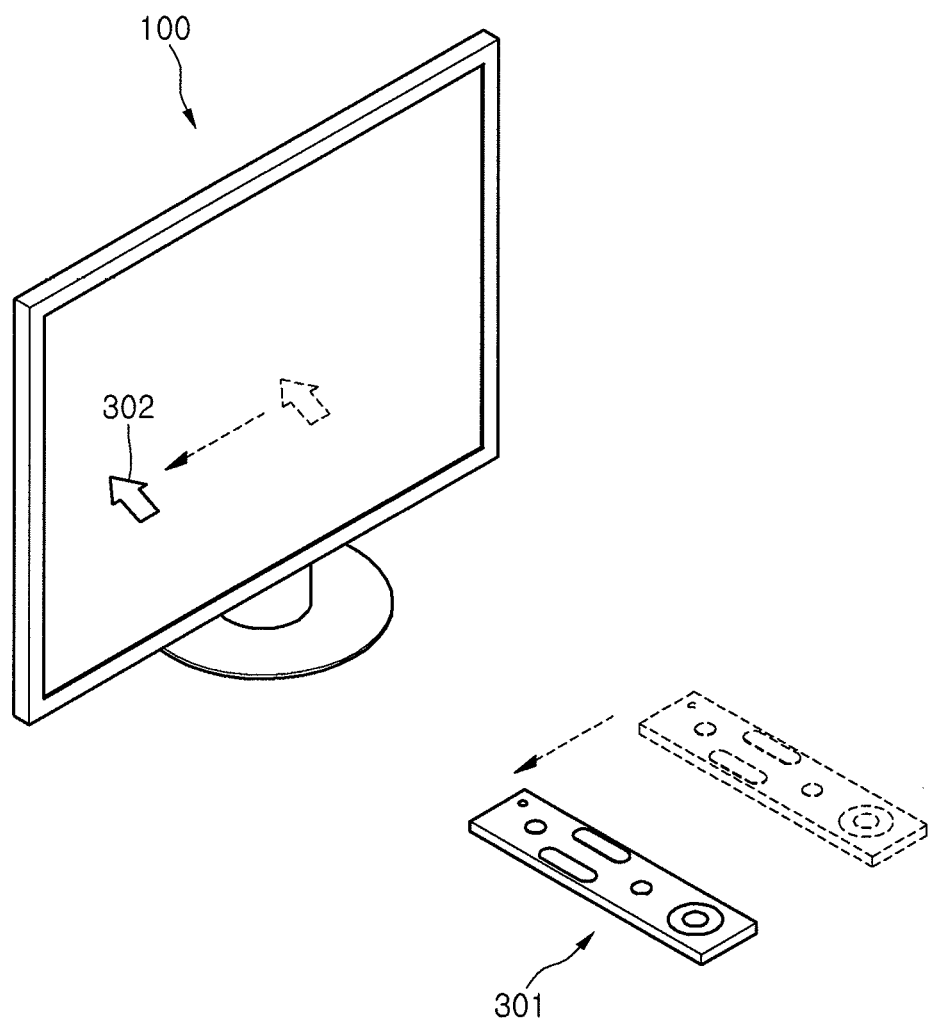

In addition, the windows of the program guide displayed on the screen of the broadcast receiving device 100 according to the present invention may be edited by using direction key buttons of a remote control device (a remote control or remote controller), or may be edited by using a motion-sensitive remote control device as shown in FIGS. 3 and 4.

FIGS. 3 and 4 are views illustrating examples of using a motion-sensitive remote control device 301 to provide inputs to the broadcast receiving device 100 according to the present invention. The motion-sensitive remote control device 301 may be used as the remote control device 194 of FIG. 1.

The motion-sensitive remote control device 301 is one kind of the remote control device 194 for inputting a command to the broadcast receiving device 100. In this embodiment, the motion-sensitive remote control device 301 may transmit/receive signals according to the broadcast receiving device 100 and RF communication standard. As shown in FIG. 3, a pointer 302 corresponding to the motion-sensitive remote control device 301 may be displayed on the screen (e.g., display unit 160) of the broadcast receiving device 100.

A user then may move the motion-sensitive remote control device 301 up and down, left and right, or back and forth, or may rotate it or move it in any direction. The pointer 302 displayed on the broadcast receiving device 100 may correspond to the movement of the motion-sensitive remote control device 301 and thus move accordingly. FIG. 4 is a view illustrating that the pointer displayed on the screen of the broadcast receiving device 100 moves according to the movement of the motion-sensitive remote control device 301.

As shown in FIG. 3, if a user moves the motion-sensitive remote control device 301 to the left, the pointer displayed on the screen of the broadcast receiving device 100 also moves to the left in correspondence thereto. The motion-sensitive remote control device 301 of this embodiment includes a sensor for determining the movement of the motion-sensitive remote control device 301. Information about the movement of the motion-sensitive remote control device 301 sensed by the sensor of the motion-sensitive remote control device 301 is transmitted to the broadcast receiving device 100. The broadcast receiving device 100 determines an operation of the motion-sensitive remote control device 301 from the information about the movement of the motion-sensitive remote control device 301 and calculates a coordinate value of the pointer 302 corresponding thereto.

FIGS. 3 and 4 illustrate examples in which the pointer 302 displayed on the display unit 160 moves in correspondence to the movement (e.g., up and down, left and right, or rotation) of the motion-sensitive remote control device 301. A moving speed and/or a moving direction of the pointer 302 may also correspond to that of the motion-sensitive remote control 301.

In this embodiment, the pointer displayed on the screen of the broadcast receiving device 100 is configured to move in correspondence to the operations/movements of the motion-sensitive remote control device 301. In another example, a predetermined command may be inputted to the broadcast receiving device 100 in correspondence to the operations/movements of the motion-sensitive remote control device 301. For example, if the motion-sensitive remote control device 301 moves back and forth, the size of an image displayed on the screen of the broadcast receiving device 100 may be enlarged or reduced. Accordingly, this embodiment does not limit the scope of the present invention.

As mentioned below, an object displayed on a display of a broadcast receiving device is selected or a drag and drop operation may be performed by using the motion-sensitive remote control device 301 to move the object displayed on the display of the broadcast receiving device. Accordingly, the motion-sensitive remote control device 301 may be used as an input unit in a broadcast receiving device such as TV in the similar manner as a mouse or the like may be used to input a command in a personal computer (PC)

Figure 5:
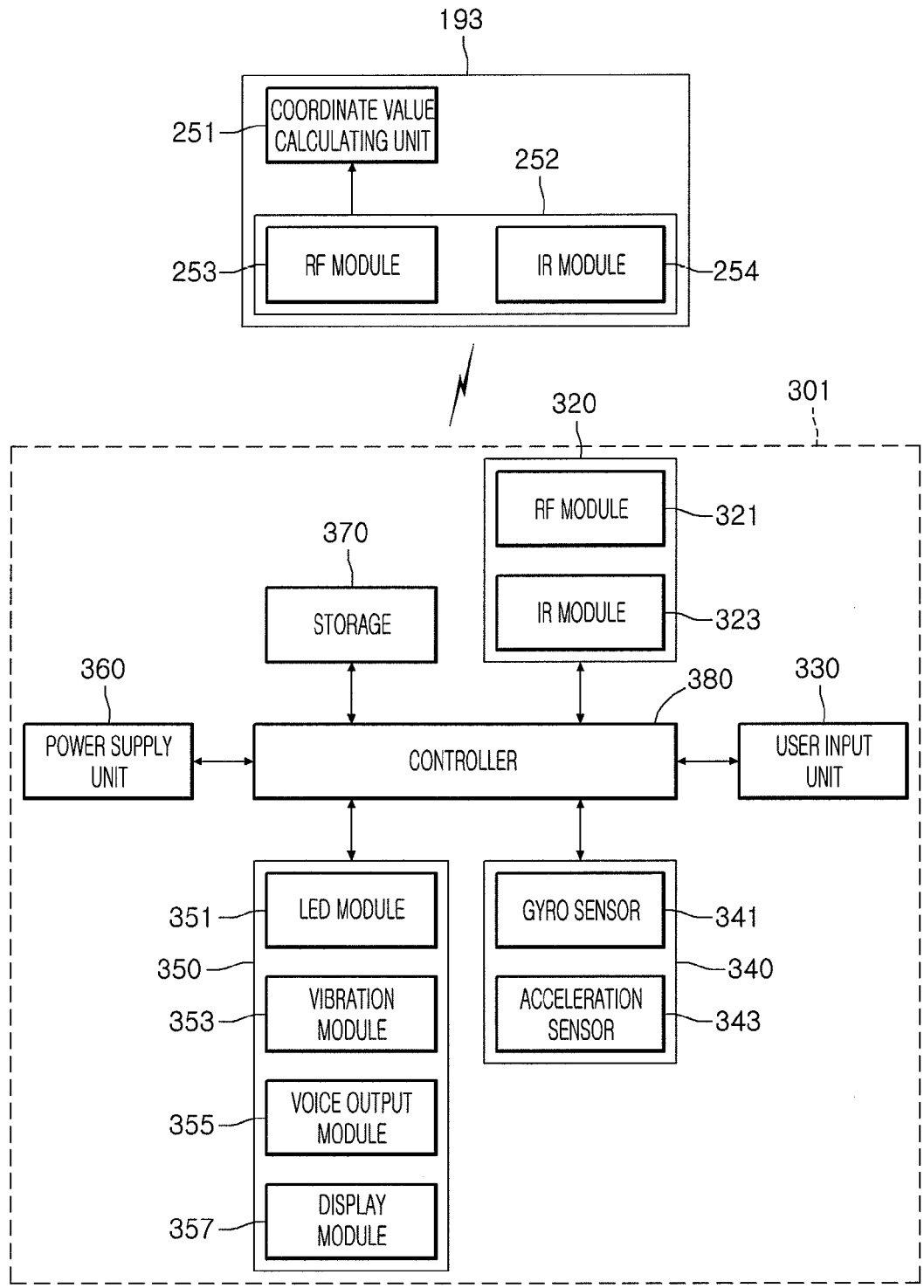
FIG. 5 is a block diagram of a motion-sensitive remote controller of FIGS. 3 and 4 used as the interface and the remote control device of FIG. 1.

FIG. 5 illustrates a block diagram of the motion-sensitive remote control device 301 of FIGS. 3 and 4 which is used as the remote control device 194 of FIG. 1 communicating with the interface 193.

Referring to FIG. 5, the motion-sensitive remote control device 301 may include a radio communication unit 320, a user input unit, 330, a sensor unit 340, an output unit 350, a power supply unit 360, a storage 370, and a controller 380. All components of the motion-sensitive remote control device 301 are operatively coupled and configured.

The radio communication unit 320 transmits and receives signals to and from the broadcast receiving device 100. In this example, the motion-sensitive remote control 301 may include the interface 310 of the broadcast receiving device 100 and an RF module 321 for transmitting and receiving signals according to RF communication standards. In addition, the motion-sensitive remote control device 301 may include the interface 310 of the broadcast receiving device 100 and an IR module 323 for transmitting and receiving signals according to IR communication standards.

In this embodiment, the motion-sensitive remote control device 301 transmits signals (containing information about the operations of the motion-sensitive remote control device 301) to the broadcast receiving device 100 through the RF module 321. Moreover, the motion-sensitive remote control device 301 may receive signals transmitted from the broadcast receiving device 100 through the RF module 321. Furthermore, the motion-sensitive remote control device 301 may transmit commands about power on/off, channel change, volume change to the broadcast receiving device 100 through the IR module 323, if necessary.

The user input unit 330 may include a keypad or buttons. A user manipulates the user input unit 330 to input commands related to the broadcast receiving device 100 using the motion-sensitive remote control 301. If the user input unit 330 has a hard key button, the user may input commands related to the broadcast receiving device 100 using the motion-sensitive remote control device 301 through a push operation of the hard key button. If the user input unit 330 has a touch screen, the user may input commands related to the broadcast receiving device 100 using the motion-sensitive remote control device 301 by touching of a soft key of the touch screen. In addition, the user input unit 330 may include various kinds of input units that the user can manipulate such as a scroll key or a jog key but this example does not limit the scope of the present invention.

The sensor unit 340 may include a gyro sensor 341 and/or an acceleration sensor 343. The gyro sensor 341 may sense information related to the operations of the motion-sensitive remote control device 301. For example, the gyro sensor 341 may sense information related to the operations of the motion-sensitive remote control device 301, with reference to x, y, and z axes. The gyro sensor 341 may sense information related to a moving speed of the motion-sensitive remote control device 301. An output unit 350 may output image or sound signals, which correspond to a manipulation of the user input unit 330 and/or a signal transmitted from the broadcast receiving device 100. The user may recognize, by using the output unit 350, whether there is a manipulation of the user input unit 330 or there is a control of the broadcast receiving device 100.

As one example, the output unit 350 may include a light emitting diode (LED) module 351 for illuminating when the user input unit 330 is manipulated or a signal of the broadcast receiving device 100 is transmitted or received through the radio communication unit 320, a vibration module 353 for generating vibration, a voice output module 355 for outputting a voice, and a display module 357 for outputting an image.

The power supply unit 360 may supply power to the motion-sensitive remote control device 301. The power supply unit 360 can cut off power to reduce power consumption when the motion-sensitive remote control device 301 has not moved for a predetermined time. The power supply unit 360 may resume power supply when a predetermined key of the motion-sensitive remote control device 301 is manipulated.

The storage 370 may store various kinds of application data for controls or operations of the motion-sensitive remote control device 301. If the motion-sensitive remote control device 301 transmits/receives signals wirelessly through the broadcast receiving device 100 and the RF module 321, the motion-sensitive remote control device 301 and the broadcast receiving device 100 may transmit/receive signals via a predetermined frequency band. The controller 380 of the motion-sensitive remote control device 301 may store and refer to information about a frequency band, via which signals are transmitted or received wirelessly to or from the broadcast receiving device 100 paired with the motion-sensitive remote control device 301.

The controller 380 controls general operations related to the motion-sensitive remote control device 301. The controller 380 may transmit a signal corresponding to a predetermined key manipulation of the user input unit 330 or a signal corresponding to an operation of the motion-sensitive remote control device 301 that the sensor unit 340 senses, to the interface 193 of the broadcast receiving device 100 through the radio communication unit 320.

The interface 193 of the broadcast receiving device 100 may include a radio communication unit 252 for transmitting or receiving signals to or from a motion-sensitive remote control device 301 wirelessly, and a coordinate value calculating unit 251 for calculating a coordinate value of a pointer corresponding to an operation of the motion-sensitive remote control device 301.

The radio communication unit 252 may transmit or receive signals to or from the motion-sensitive remote control device 301 wirelessly through the RF module 253 or the IR module 254.

The coordinate value calculating unit 251 corrects handshake or errors from signals corresponding to the operations of the motion-sensitive remote control device 301, which are received through the radio communication unit 252, such that a coordinate value (x, y) of the pointer 302 to be displayed on the display 160 can be calculated.

In addition, a transport signal of the motion-sensitive remote control device 301, inputted to the broadcast receiving device 100 through the interface 193, is transmitted to the controller 160 of the broadcast receiving device 100. The controller 160 determines information about the operations of the motion-sensitive remote control device 301 and key manipulation from the signals transmitted from the motion-sensitive remote control device 301 and controls the broadcast receiving device 100 according thereto.

The block diagram of the motion-sensitive remote control device 301 related to the broadcast receiving device 100 and the remote control device 194 of FIGS. 1 and 5 is one example according to an embodiment. Each component of the block diagram may be integrated, added, or omitted according to specifications of the actually-realized broadcast receiving device 100 and the motion-sensitive remote control device 301. For example, more than two components may be integrated into one component or one component may be divided into more than two components, if necessary. In addition, functions performed in each block can be used to describe an embodiment, but their specific operations or components do not limit the scope of the present invention.

Figure 6:
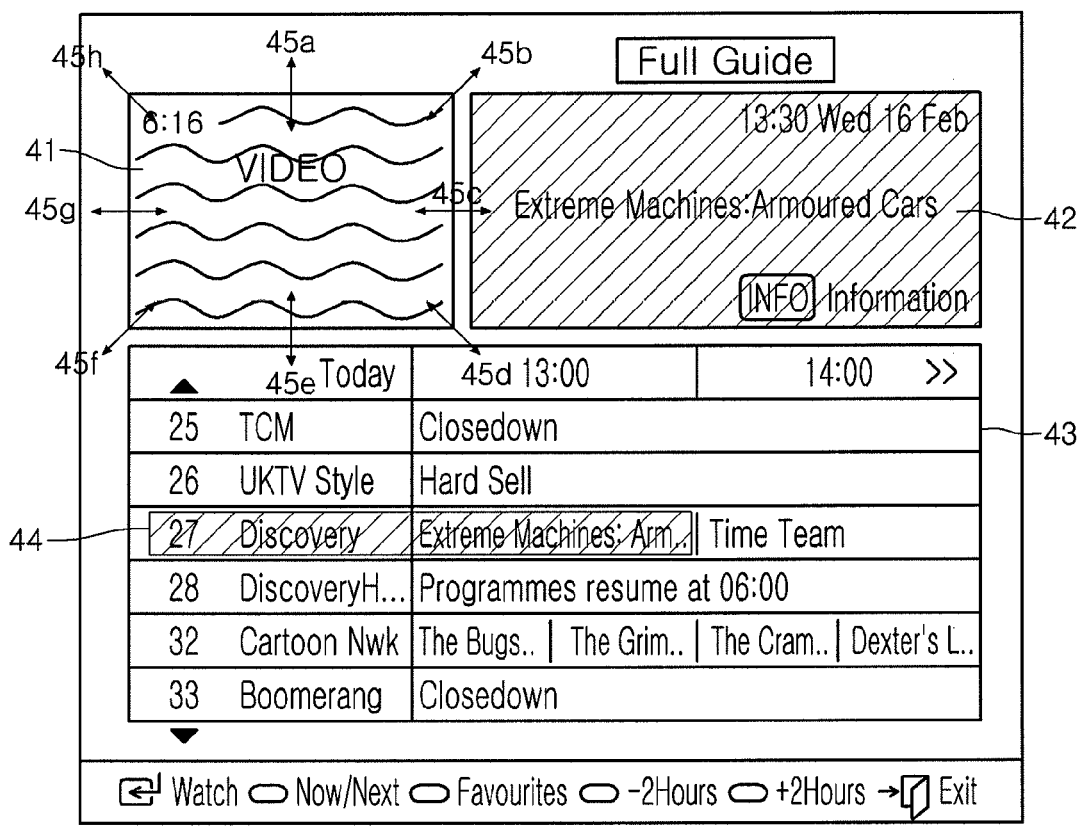
FIGS. 6 through 8 illustrate examples of a program guide displayed on a display for explaining a method of varying a size of a window of the program guide of a broadcast receiving device according to an embodiment of the invention.
Figure 7:
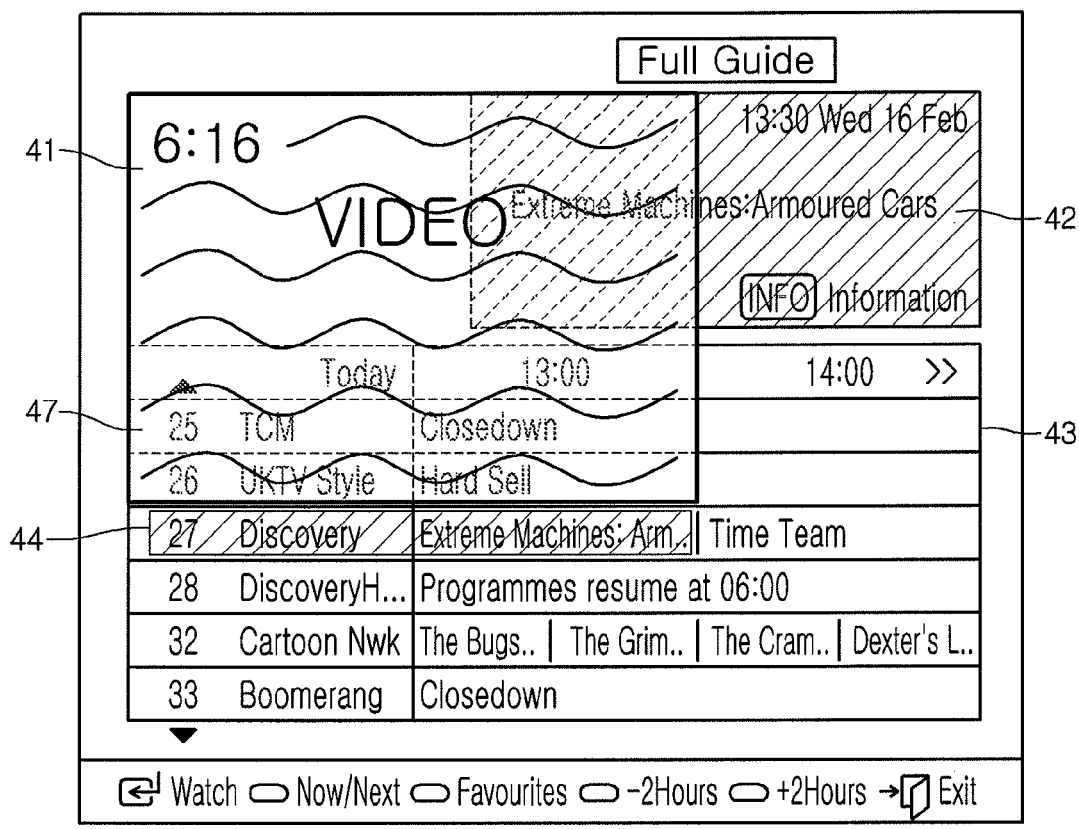
Figure 8:
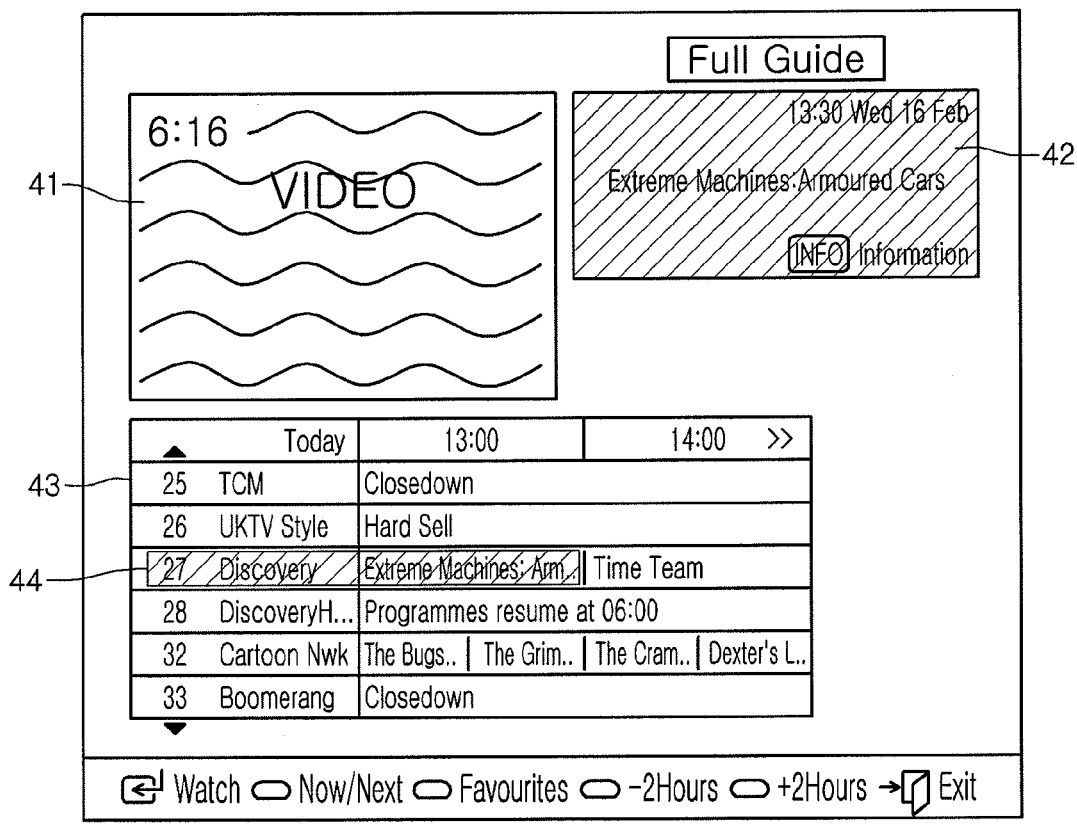

FIGS. 6 through 8 illustrate a method of varying a size of a window of a program guide displayed on a screen of a broadcast receiving device according to an embodiment.

FIG. 6 illustrates a program guide 40 that the broadcast receiving device 100 provides on the display unit 160 according to an embodiment. When a user selects a menu for a program guide while viewing the programs/broadcasts on the display unit (e.g., TV/computer/terminal screen) in a full screen, the menu of FIG. 6 is displayed. This menu can be displayed on the full screen of the display unit 160, or may be displayed at a designated area on the screen while the remainder of the screen continuously displays the broadcast contents/programs.

As shown in FIG. 6, the program guide 40 may include a video window 41 for displaying an image corresponding to a video signal, a data window 42 for displaying detailed information about a broadcast program that the user selects, and a schedule list window 43 for displaying schedule information about the broadcast programs of the broadcasting receiving device 100.

The video window 41 may first display a TV screen/program that the user was currently viewing before the program guide 40 is displayed. When the user selects another channel in the schedule list window 43, a TV program corresponding to the channel is displayed on the video window 41. As such, the video window 41 may continuously display the broadcast program that the user was viewing before the program guide menu is selected to be displayed.

Information about the TV program currently displayed on the video window 41 may be displayed on the data window 42. Information about a TV program may include contents summary, air time, and cast of the TV program, etc.

The schedule list window 43 displays a schedule of TV programs and may display TV programs for each channel or hourly TV programs. In the window 43 of FIG. 6, a first column displays a station name, a second column displays a channel number, and a third column displays a currently broadcasted TV program title. According to an embodiment, previous TV program titles and next TV program titles in hourly intervals may be displayed at the same time. An item 44 that the user currently has selected in the schedule list is highlighted and also another item is selected when the user presses an arrow button of the remote control device 194 of FIG. 1 or uses the motion-sensitive remote control device 301 of FIGS. 3 through 5.

According to an embodiment, one or more configurations of the program guide of FIG. 6 may be changed according to an input of the user. For example, a size of each of the windows constituting the program guide may be changed.

For example, the user may change the size of the video window 41 in FIG. 6. The user may enlarge or reduce the size of the video window 41 by pressing a predetermined button (for example, a +/− button or a channel up/down button) of the remote control device 194 while the video window 41 is selected. A process for changing the size of the video window 41 may be performed by the scaler 142 of the program guide editing unit 140 as mentioned above.

Selectively, as shown in FIG. 6, the user can point out one edge of the video window 41 by using the motion-sensitive remote control 194 and then can adjust the size of the video window 41 through a drag and drop operation in the directions of arrows 45a through 45h. For example, after pointing to one edge of the video window 41, while pressing one button (for example, an OK button) of the motion-sensitive remote control 194, the user can enlarge the video window 41 until the user is satisfied and then can release the button, such that the size of the video window 41 can be changed according to the user input and user preference. When the user points to one edge, one of the arrows 45a to 45h is displayed on the edge, such that the user may recognize that the size of the window can be adjusted in that direction.

By dragging and dropping a point in the directions of the arrows 45b, 45d, 45f, and 45h at window edges, a window is enlarged or reduced while an aspect ratio of the window is maintained. If dragging and dropping a point in the directions of arrows 45a, 45c, 45e, and 45g corresponding to one side of a window is performed, the window is enlarged or reduced only in the dragged direction. If the aspect ratio of the window is distorted, the scaler 142 of the program guide editing unit 140 may differently scale a height and width enlargement or reduction ratio of the TV screen. The size of the other windows 42 and 43 may be changed in the same or similar manner as the window 41.

FIG. 7 illustrates an example of a program guide displayed on a screen of the broadcast receiving device after the window size is changed according to an embodiment. As shown in FIG. 7, when a user enlarges the video window 41, the other windows 43 and 43 can remain the same and only the video window 41 is enlarged and displayed. Here, portions 47 of the video window 41 that overlap the other windows may be displayed semi-transparently so that the overlapped portions of the other windows are visible or may be displayed normally so that the overlapped portions of the other windows are visible.

FIG. 8 illustrates an example of a program guide displayed on a screen of the broadcast receiving device after the window size is changed according to another example. As shown in FIG. 8, when a user enlarges the video window 41 or changes the size of the video window 41, the other windows 42 and 43 may be appropriately reduced or resized in order not to overlap the video window 41. That is, the size and/or shape of the other windows may be adjusted not to overlap the video window which has been resized or reshaped according to the user input. The resizing/reshaping of all the windows on the screen may occur so as to maximize the displaying of the windows on the screen. And the resizing/reshaping of the windows on the screen may occur automatically (e.g., when the video window 41 is resized or in response to a user's command).

FIGS. 9 to 13 illustrate a method of changing an arrangement (e.g., position) of windows that constitute a program guide displayed on a screen of a broadcast receiving device according to an embodiment.

Figure 9:
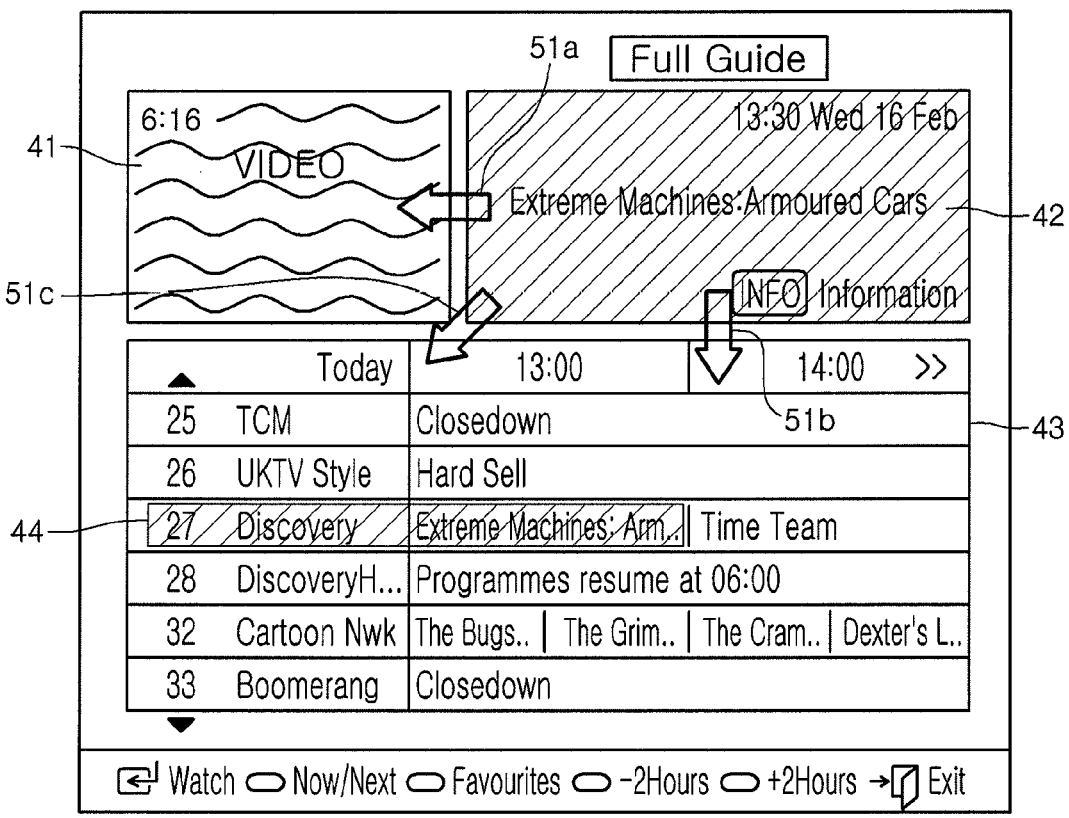
FIGS. 9 to 13 illustrate examples of a program guide displayed on a display unit for explaining a method of changing an arrangement of windows of the program guide of a broadcast receiving device according to an embodiment of the invention.

As shown in FIG. 9, a position of the data window 42 (e.g., one of the windows constituting the program guide 40) on the screen can be moved according to the user input. To do this, the user may select the data window 42 and then move it in the desired directions of arrows 51a and 51b, e.g., by pressing a predetermined key (for example, an arrow key or a direction key) of a remote control device associated with the broadcast receiving device. The user may move the data window 42 in a diagonal direction 51c by pressing a down direction key and a left direction key at the same time. In addition, according to an embodiment, the user may use the motion-sensitive remote control device to point to the data window 42 and then drag and drop the data window 42 at a desired position on the screen of the broadcast receiving device. Other known methods of moving an object can be used to move the location of any window on the screen. The user can change the location of the other windows 41 and 43 on the screen in the same manner. As a result, the user can arrange how the various windows of the program guide may be arranged and located on the screen of the broadcast receiving device.

Figure 10:
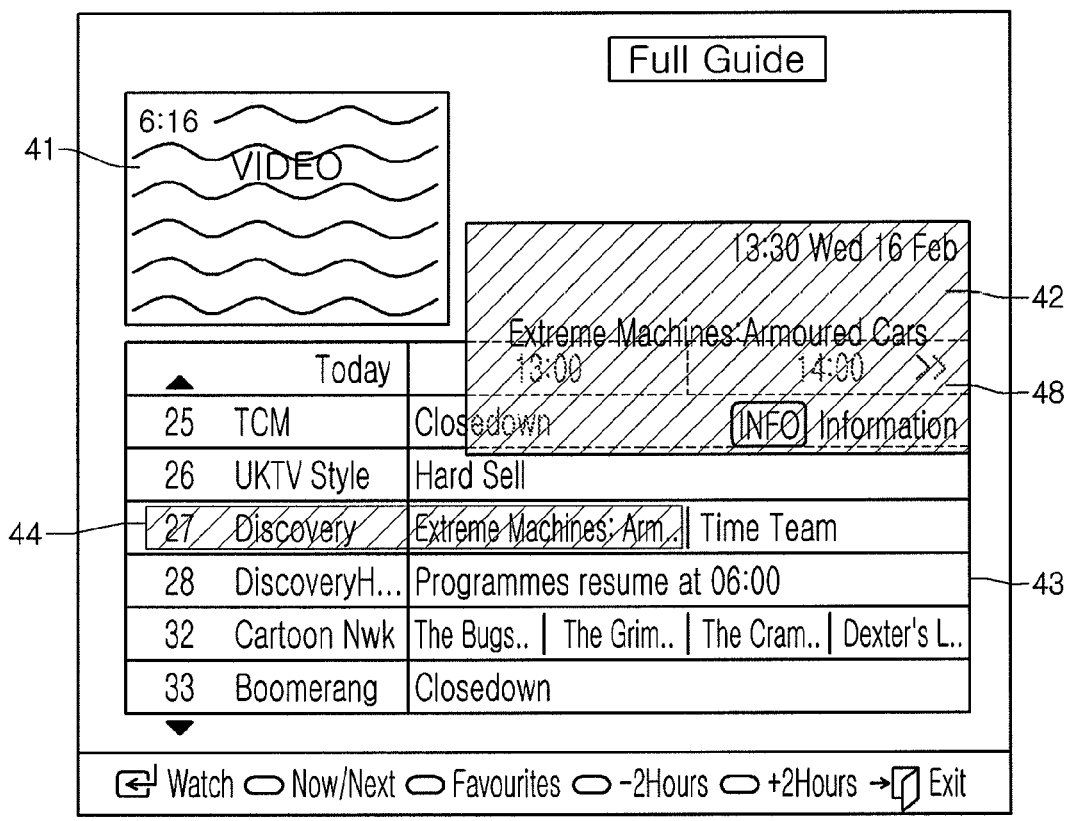
Figure 11:
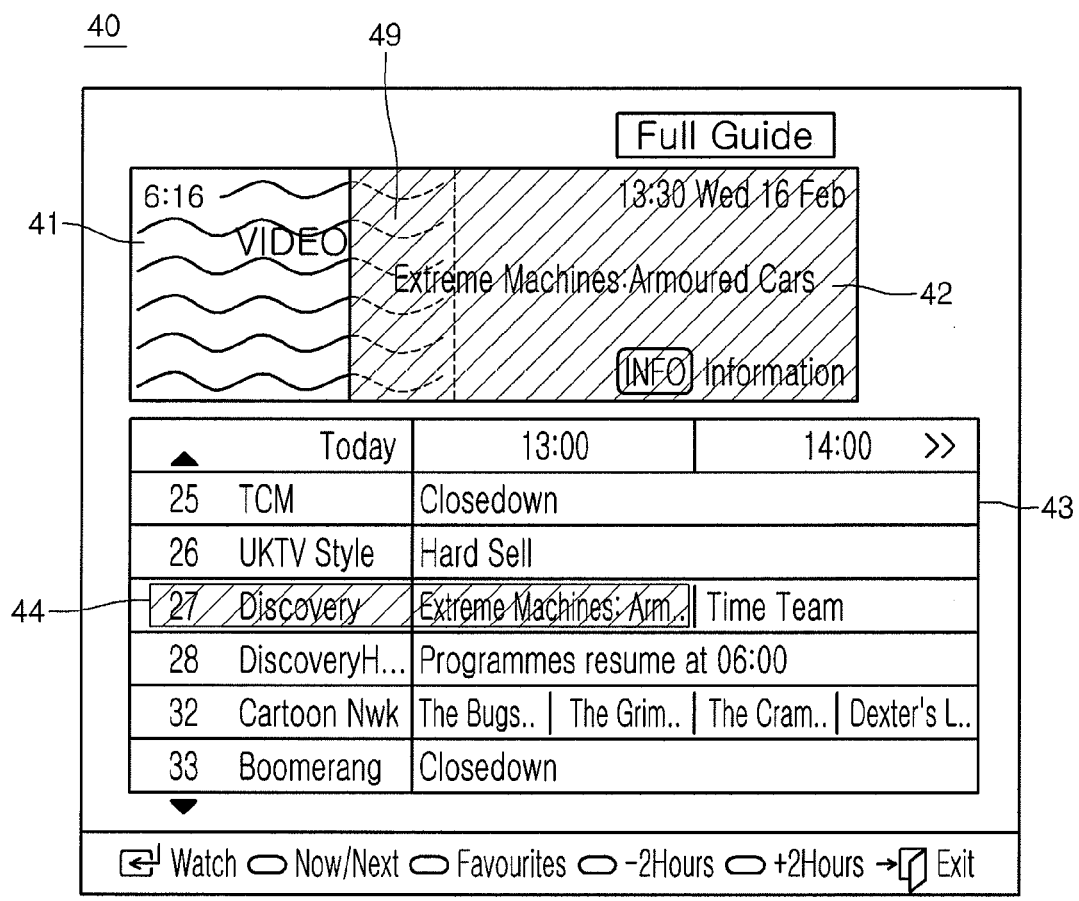

FIGS. 10 and 11 are examples of a program guide displayed on the screen of the broadcast receiving device, which illustrate window position change results according to an embodiment. When the data window 42 is moved in a down direction as shown in FIG. 10 or moves in a left direction as shown in FIG. 11 by the user while the user is viewing the screen of the broadcast receiving device, the positions of the remaining windows 41 and 43 may not change. Portions 48 and 49 of the data window 42 that overlap the other windows 41 and 43 are displayed semi-transparently so that the overlapped portions of the other windows 41 and 43 can be visible or may be displayed normally so that the overlapped portions of the other windows 41 and 43 may not be visible. If the user desires to view a particular window on the screen better, the user may move any of the windows to provide this effect.

Figure 12:
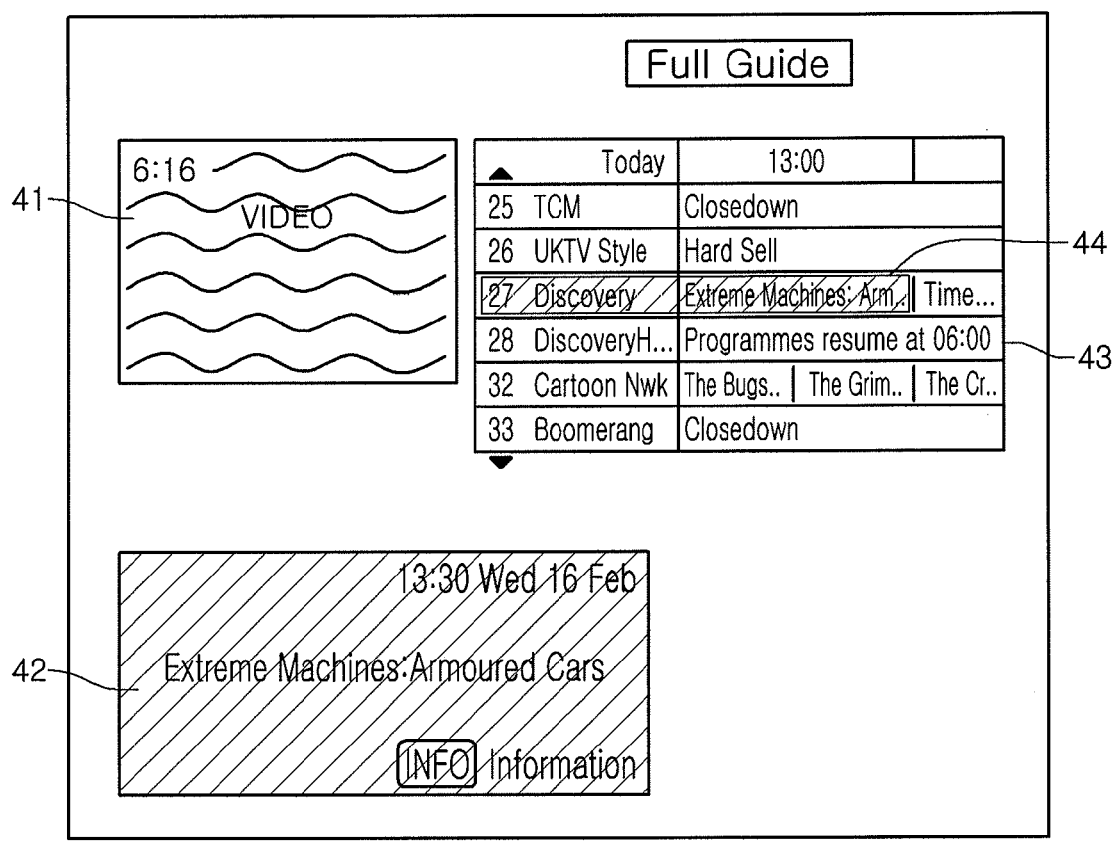
Figure 13:
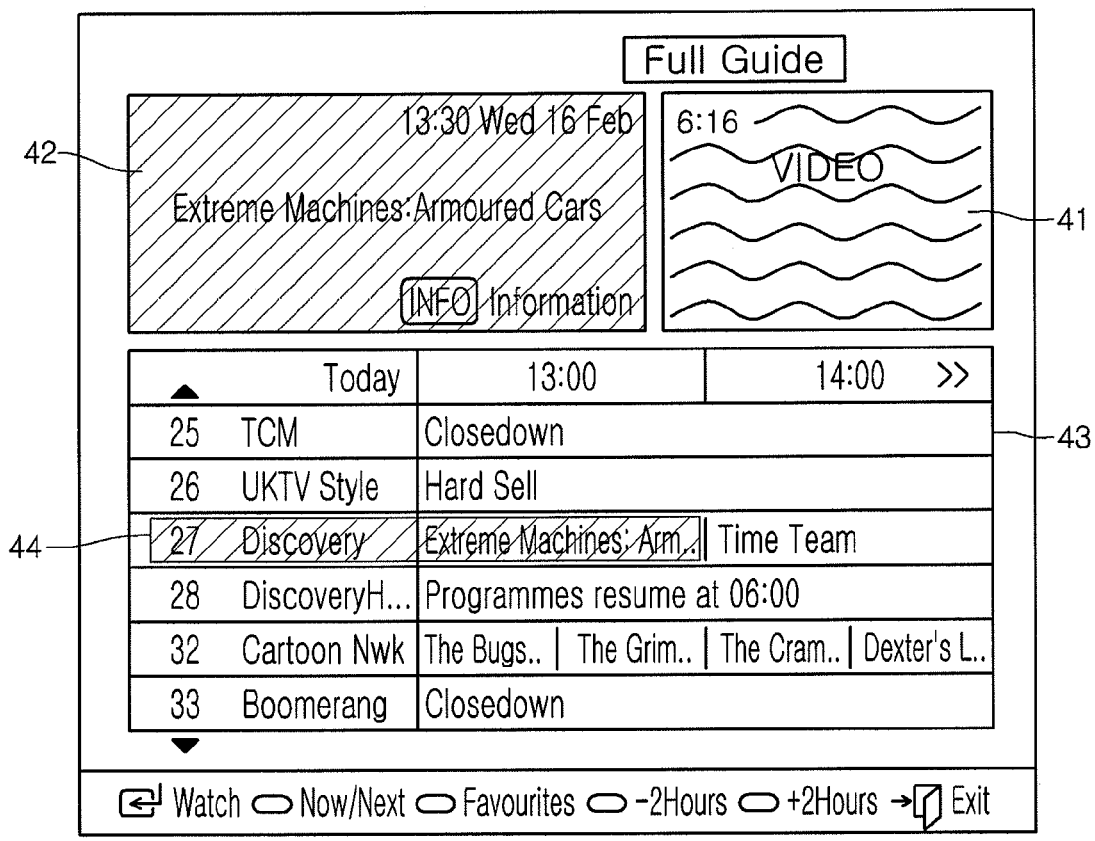

FIGS. 12 and 13 are examples of a program guide displayed on a screen of the broadcast receiving device, which illustrate window position change results according to another embodiment.

FIG. 12 illustrates an example of a program guide displayed on the screen when the data window 42 is moved to the bottom of the screen and FIG. 13 illustrates an example of a program guide displayed on the screen when the data window 42 is moved to the left of the screen. As shown in FIG. 12, if the data window 42 is moved to the bottom of the screen/program guide, the schedule list window 43 which was positioned below the data window 42 can move to the original position of the data window 42 while the data window 42 is moved to the original/initial position of the schedule list window 43. For example, the windows 42 and 43 can change their positions interchangeably with each other on the screen.

Likewise, if the data window 42 is moved to the left of the screen as shown in FIG. 13, the video window 41 and the data window 42 can change their positions interchangeably with each other on the screen. Further, as the positions of the windows on the screen are switched, the size/shape of the windows can be automatically adjusted so that the windows can be displayed at maximum sizes on the screen for a maximum viewing.

According to an embodiment, if a position change of a window (for example, the data window 42) on the screen that the user wants to move is less than a predetermined distance, positions of all windows of the program guide displayed on the screen may be fixed as shown in FIG. 10 or FIG. 11. As a variation, if a position change of a window on the screen is more than the predetermined distance, positions of the windows on the screen may be switched as shown in FIG. 12 or FIG. 13. For example, the predetermined distance may correspond to a distance when a portion of a window is moved and overlaps the other windows by more than 50%. The predetermined distance may be set variably according to the preference and system configuration.

Figure 14:
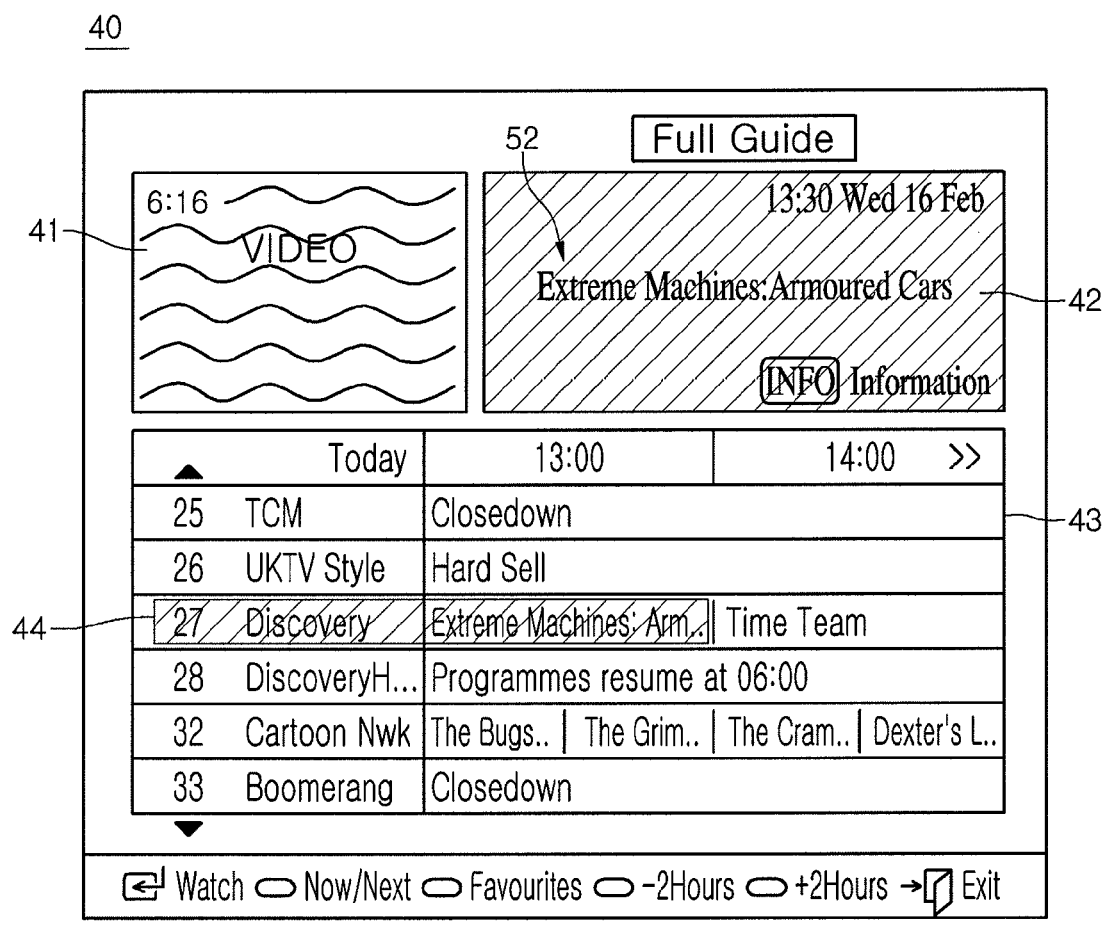
FIG. 14 is a view illustrating a method of changing configurations of windows of a program guide of a broadcast receiving device according to an embodiment of the invention.

FIG. 14 is a view illustrating a method of changing other configurations (e.g., properties) of windows of a program guide displayed on a screen of a broadcast receiving device according to an embodiment.

According to the present invention, a user may change other configurations such as properties/formats of the windows of the program guide displayed on the screen. The properties of the windows may be, e.g., color, highlights, brightness, font, font size, wallpaper, contrast ratio, language displayed, etc. of the windows constituting the program guide.

For example, as shown in FIG. 14, when one window (for example, the data window 42) among the windows 41, 42, and 43 of the program guide displayed on the screen is selected, a font or font size of a text displayed on the data window 42 may be changed. For example, the user may change sizes, colors, fonts, wallpapers, screen state values, etc. of the data window 42 by pressing a predetermined button such as a +/- button, a up/down button, etc. on the remote control device. Each time one of the above buttons is pressed, the font of the selected window may be changed into another font and when another button is pressed, then the font size of the selected window may be changed on the screen. As a variation, when the data window 42 is selected, a menu for editing the properties of the window 42, e.g., sizes, colors, fonts, wallpapers, screen state values, etc. can be displayed on the screen and the user may change the above configurations through the menu displayed on the screen of the broadcast receiving device.

When the user changes a wallpaper, an image or its color constituting the wallpaper of the data window 42 may be changed, and when the screen state value such as the contrast ratio is changed, only the screen state of the data window 42 may be changed on the program guide 40 as displayed on the screen.

Figure 15:
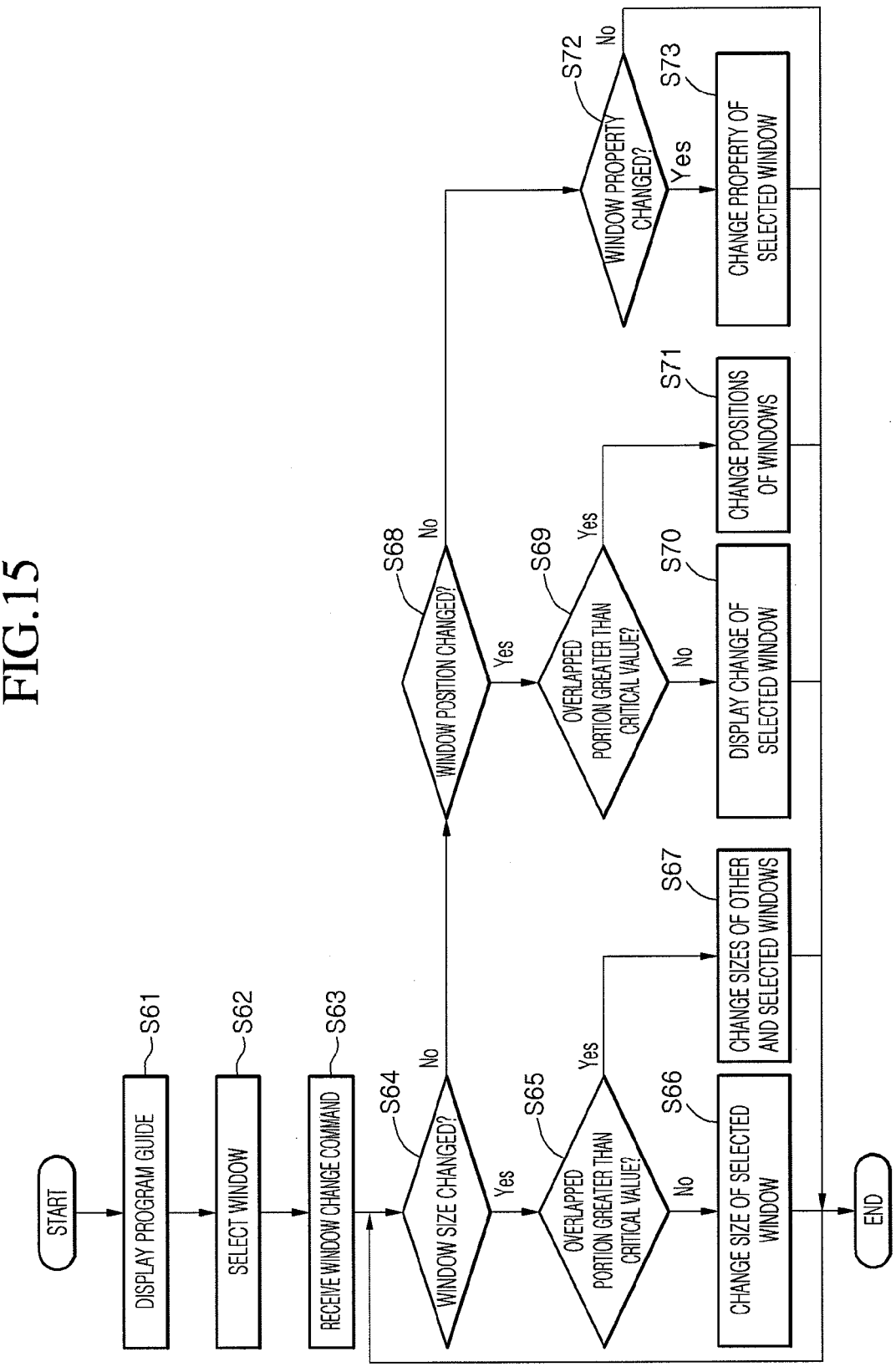
FIG. 15 is a flowchart illustrating a method of changing a guide program of a broadcast receiving device according to another embodiment of the invention.

FIG. 15 is a flowchart illustrating a method of changing configurations of a program guide displayed on a screen of a broadcast receiving device based on the user input according to another embodiment. The method of FIG. 15 and other methods discussed above and below can be implemented in the broadcast receiving device 100 or in other suitable device.

In operation S61, when a command for displaying a program guide is received from a user to the broadcast receiving device, the program guide is displayed on the screen of the broadcast receiving device. As mentioned above, the program guide may include at least one window for displaying information about the received broadcast signals.

In operation S62, the broadcast receiving devices receives a selection of at least one window among the displayed windows of the program guide from the user.

In operation S63, a command for changing at least one configuration of the selected window is received by the broadcast receiving device from the user. Here the at least one configuration can be the size of the window, the location/position of the window, or the property of the window as discussed above.

In operation S64, the broadcast receiving device (e.g., the controller 170) determines whether the configuration change command relates to changing the window size. If the configuration change command is determined to be the window size changing command, the method proceeds to operation S65, and if not, the method proceeds to operation S68.

In operation S65, after the size of the selected window (which is changed according to a user command as discussed above) is enlarged, reduced or otherwise changed on the screen of the broadcast receiving device, the controller 170 determines if its overlapping area with the other windows on the screen is more than a critical/reference value (for example, 50% of an area of another window). If so, the size of the overlapped window is appropriately reduced or adjusted in operation S67 so that all the windows of the program guide can be maximally displayed on the screen. If the overlapped area is less than the critical value, then the size of only the selected window on the screen is enlarged/adjusted according to the user input and displayed as such on the screen in operation S66. When only the size of the selected window of the program guide is enlarged/varied and then displayed on the screen, a portion of the selected window that overlaps the other window(s) may be displayed semi-transparently or may be displayed normally.

In operation S68, if the configuration change command is a command for changing a window position, the method proceeds to operation S69, and if not, the method proceeds to operation S72.

In operation S69, the controller 170 determines whether an area of the window that overlaps another window after the position of the selected window is changed is more than a critical/reference value (for example, 50% of an area of another window). If the overlapped area is greater than the critical value, the positions of the overlapped windows switched to maximize viewing in operation S71, and if not, the position of the selected window is changed while the positions of the other windows remain the same on the screen. A portion of the relocated window that overlaps the other windows on the screen may be displayed semi-transparently or may be normally.

In operation S72, if the configuration change command is a command for changing a property of the selected window, the property of the selected window of the program guide on the screen is changed according to the user input in operation S73. More than one properties of the selected window may be changed at the same time or according to the user command(s). As mentioned above, the property of a window may include a size, a color, and a font of a text, a wallpaper, and a screen state value of the window. In this regard, when the configuration change command is input, a list of properties of a window which can be selected for modification may be displayed on the screen to assist the user with this process.

After any one of steps S66, S67, S70, S71, S72 and S73, the method can return to step S64 so that another configuration of the selected window may be changed. Further, the user can select a plurality of windows of the program guide on the screen simultaneously to simultaneously vary the configuration(s) of the selected multiple windows. Moreover, various editing and input operations (e.g., drag-and-drop, menu item selections, etc.) can be used for the user to input commands for changing the configurations of the selected window, and such input can be made through the remote control device or directly to the display unit (e.g., by touching the display unit, if the display unit is a touch screen).

According to the present invention, the user can edit one or more configurations (e.g., sizes, arrangements, properties, etc.) of windows constituting the program guide displayed (or to be displayed) on the screen of the broadcast receiving device according to the user input in the exact manner desired or preferred by the user. As a result, the user experience of using the program guide on the screen of the broadcast receiving device of the invention is enhanced.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A broadcast receiving device comprising:
 a broadcast receiver configured to receive broadcast signals;
 a demodulator configured to demodulate the received broadcast signals to generate transport streams;
 a demultiplexer configured to demultiplex the demodulated transport streams into at least one of a video stream, an audio stream and a data stream;
 a user interface configured to provide a user input to a controller;
 a display unit configured to display a program guide including a plurality of windows for displaying information associated with the broadcast signals;
 a program guide editing unit configured to edit the program guide displayed on the display unit according to the user input; and
 the controller configured to control the program guide editing unit to edit the program guide,
 wherein, when the user input indicates that a size of a selected window of the program guide displayed on the display unit is to be changed, the controller controls the program guide editing unit to change a size of the selected window while a size of other windows remain the same on the displayed program guide,
 wherein the controller controls the program guide editing unit to semi-transparently display a portion of the selected window that overlaps at least one of the other windows of the program guide if an overlapping area is less than a critical value, and wherein, if the size of the selected window is enlarged, and the overlapping area with the at least one of the other windows is more than the critical value, the controller reduces a size of the at least one of the other windows.

2. The broadcast receiving device according to claim 1, wherein the program guide editing unit comprises:
 a window memory configured to store information to be displayed on each of the plurality of windows of the program guide;
 a scaler configured to change a size of one of the plurality of windows according to the user input; and
 a processor configured to control the information stored in the window memory to be displayed and the scaler to change the size of the one of the plurality of windows.

3. The broadcast receiving device according to claim 1, wherein the program editing unit varies at least one configuration of one of the plurality of windows displayed on the display unit according to the user input.

4. The broadcast receiving device according to claim 3, wherein the at least one configuration of one of the plurality of windows comprises at least one of a size, a position and a property of one of the plurality of windows.

5. The broadcast receiving device according to claim 4, wherein the property of one of the plurality of windows comprises at least one of the following: a size of the window, a color of the window, a font of the window, a wallpaper of the window, and a screen state value of the window.

6. The broadcast receiving device according to claim 1, wherein one of the plurality of windows comprises at least one of a video window, a data window and a schedule list window.

7. The broadcast receiving device according to claim 1, wherein the program guide editing unit receives the user input in the form of a drag-and-drop operation, a touch screen operation, or a menu selection operation.

8. An image processor comprising:
 a user interface configured to receive a user input;
 a display unit;
 a program guide editing unit configured to editing a program guide including a plurality of windows, according to the user input; and
 a controller configured to control the program guide editing unit and the user interface,
 wherein when the user input indicates that a size of a selected window of the program guide displayed on the display unit is to be changed, the controller controls the program guide editing unit to change a size of the selected window while a size of other windows remain the same on the displayed program guide,
 wherein the controller controls the program guide editing unit to semi-transparently display a portion of the selected window that overlaps at least one of the other windows of the program guide if an overlapping area is less than a critical value, and
 wherein if the size of the selected window is enlarged, and the overlapping area with the at least one of the other windows is more than the critical value, the controller reduces a size of the at least one of the other windows.

9. The image processor according to claim 8, wherein the program guide editing units varies at least one of a size, a position and a property of one of the plurality of windows displayed on a screen, according to the user input.

10. The image processor according to claim 9, wherein the user input includes an operation of dragging and dropping edges of the at least one window, or an operation of dragging and dropping the at least one window.

11. A method for providing a program guide using an image processor including a program guide editing unit, the method comprising:
 receiving a selection of windows constituting the program guide including a plurality of windows;
 receiving an edit command for editing a selected window from a user; and
 editing a configuration of the selected window according to the edit command,
 wherein when a user input indicates that a size of the selected window of the program guide is to be changed, the editing step includes:
 changing the size of the selected window of the program guide according to the user input while a size of other windows remain the same on the displayed program guide;
 if an overlapping area with at least one of the other windows by the changing of the size is less than a critical value, semi-transparently displaying a portion of the selected window that overlaps the at least one of the other windows of the program guide; and
 if the overlapping area with the at least one of the other windows by the changing of the size is more than the critical value, reducing a size of the at least one of the other windows.

12. The method according to claim 11, wherein the editing of the program guide comprises changing at least one configuration of one of the plurality of windows displayed on a screen according to the user input.

13. The method according to claim 12, wherein the at least one configuration of one of the plurality of windows comprises at least one of a size, a position and a property of the at least one window.

14. The method according to claim 13, wherein the property of one of the plurality of windows comprises at least one of a size, a color, and a font of a text, a wallpaper, and a screen state value of the at least one window.

15. The method according to claim 11, wherein one of the plurality of windows comprises at least one of a video window, a data window, and a schedule list window.

* * * * *